Patented Feb. 27, 1945

2,370,342

UNITED STATES PATENT OFFICE 2,370,342

HALOGENATION

Carl Naeher Zellner, Townley Union, N. J., assignor to Tide Water Associated Oil Company, Bayonne, N. J., a corporation of Delaware No Drawing. Application April 30, 1940, Serial No. 332,496

16 Claims. (Cl. 204—163)

This invention relates to halogenated organic compounds. More particularly, it relates to an improved method for producing halogenated hydrocarbons by photochemical reaction. Specifically it is concerned with the production of monohalogenated hydrocarbons.

In methods for the direct halogenation of hydrocarbons, i. e., methods wherein the hydrocarbon is reacted with halogen, mixtures of halogenated compounds having different numbers of halogen atoms are always obtained. For example, in the chlorination of paraffin and cycloparaffin hydrocarbons the formation of dichlorcompounds always accompanies the production of the generally more desirable monochlor-derivatives. Chlorinated products in which the ratio of monochlor- to dichlor-derivatives is relatively high can be produced by thermal methods wherein a mixture of chlorine and a very large excess of hydrocarbon is heated to high temperatures, the excess hydrocarbon and chlorinated products are separated by distillation and the process is repeated several times. However, this method is objectionable because it requires considerable quantities of heat and involves long periods of time for its operation.

Known photochemical halogenation methods comprise bubbling chlorine into a liquid hydrocarbon in a substantially closed vessel while exposing the hydrocarbon and gaseous chlorine mixture to light or other active rays capable of causing the reaction. While photochemical methods generally require no heat to aid the reaction and are thus more economical from a fuel consumption standpoint than the thermal method, the known photochemical methods are objectionable for other reasons. First of these reasons is that said photochemical methods are slow; the reaction, which is rapid at first, soon retards in rate and thereafter long periods of time are required to produce high conversions of the hydrocarbons to chlorinated products. Attempts to speed up the reaction often result in flashing of the chlorine with the hydrocarbon vapors above the liquid in the reaction vessel. Secondly, the ratio of monochlor- to polychlor-derivatives in the chlorinated product is very low, even when the extent of chlorination is small. Careful cooling and slow introduction of chlorine are necessary, and other conditions must be carefully controlled. Even under optimum conditions, however, the ratio of monochlor- to polychlor-derivatives produced is relatively small. For these reasons the thermal method has been more generally used, in spite of the fuel economies inherent in the photochemical reaction.

An object of the present invention is to provide a method for rapid halogenation of hydrocarbons. Another object of the present invention is to provide a photochemical halogenation method capable of rapidly converting hydrocarbons and derivatives thereof to halogenated products containing relatively large proportions of desirable halogenated compounds. Another object is to provide an easily controllable, rapid, and relatively safe method of photochemical halogenation capable of producing relatively high amounts of compounds containing one more halogen atom than is contained in the starting material; and another object is to provide such a method capable of producing a high yield of halogenated products having a high ratio of monohalogenated derivatives to polyhalogenated derivatives in a relatively short time. A further object is to provide a photochemical method capable of producing relatively pure monohalogenated products. Other objects will be apparent in the following description of the invention.

In its broad aspects the invention comprises a photochemical halogenation method comprising mixing the halogen and liquid hydrocarbon in the presence of relatively small and controlled amounts of added substances effective to promote a solution of the halogen in the hydrocarbons in a form reactive upon exposure to active rays, and exposing the resulting solution to daylight or other active rays, i. e., rays capable of causing photochemical reaction. Examples of substances which I have found particularly suitable for the purpose stated are substances which readily yield oxygen, such as air, oxygen and peroxides. The invention derives from my discovery that when there is added during the halogen-hydrocarbon mixing operation relatively small but controlled amounts of the stated oxygen containing substances a solution is formed which upon exposure to active rays in a manner more fully set forth hereinbelow yields greater amounts of halogenated products in a shorter period of time than is possible in the prior art photochemical methods described hereinabove; and that the halogenation is selective, i. e., the halogenated products so produced contain relatively high proportions of certain desirable halogenated compounds. For example, when chlorinating unchlorinated hydrocarbons according to this invention, relatively high ratios of monochlorinated compounds to polychlorinated compounds are readily produced. Likewise, halogenation of certain compounds already containing one or more halogen atoms according to this invention results in halogenated products containing desirable proportionate amounts of different halogenated compounds, which products could heretofore be obtained, if at all, only by more expensive, or otherwise objectionable, methods.

The exact reason why these results are obtained by addition of the stated oxygen containing substances is not fully understood. However, it is believed that the action of these substances is to cause a photochemically reactive solution to form. When relatively large amounts are added the photochemical reaction is retarded instead of being enhanced. I have observed, in research work leading up to this invention, that when a colorless unchlorinated hydrocarbon liquid is mixed with chlorine gas in the absence of oxygen, it remains colorless and when separated from the gaseous chlorine and exposed to active rays substantially no reaction occurs and no chlorinated products result. The same hydrocarbon when mixed with chlorine in the presence of relatively small amounts of air results in a yellow solution, which if separated from gaseous chlorine and exposed to active rays will react to form chlorinated products. This would seem to indicate that the presence of oxygen causes the hydrocarbon to dissolve or take up the chlorine in some form which is capable of reacting upon exposure to active rays.

The phenomenon is not simply one of mere solution of chlorine in the hydrocarbon but involves a solution of chlorine in the hydrocarbon in a photochemically reactive form. This is indicated by results obtained in chlorinating already partially chlorinated materials. Certain of the latter named materials will dissolve chlorine in the absence of oxygen and form a yellow solution, yet this yellow solution will not react upon separation from gaseous chlorine and exposure to active rays. If, however, a small amount of oxygen or another of the stated oxygen containing compounds is added, the photochemical reaction readily occurs upon exposure of the solution to active rays. These results indicate that chlorine can be dissolved in the hydrocarbon in at least two forms, a form which is non-reactive under the influence of active rays and a form which is highly reactive under such conditions. The addition of proper amounts of an oxygen-containing substance, according to this invention, apparently promotes solution of the chlorine in the hydrocarbon in a highly reactive form.

The present invention, therefore, differs primarily from the known photochemical methods of halogenation in that in the method of this invention there is added to the zone in which the halogen and hydrocarbon are being mixed one or more of the stated oxygen containing substances in amounts sufficient to effect continued dissolving of the chlorine in the hydrocarbon in a form which reacts with the hydrocarbon upon exposure of the resulting solution to active rays.

For convenience, the term "solution" is used herein and in the appended claims in describing the photochemically reactive halogen-bearing liquid formed. This term is not necessarily to be limited to mean a true chemical solution, since, as indicated above, the real relation of the halogen and hydrocarbon in said liquid is not definitely known. It may be that the halogen is converted by the oxygen to a different form, or to a halogen compound highly reactive in nature.

As another feature of this invention, I have discovered that further improved results can be obtained by irradiating the photochemically active solution produced as described above, in a zone containing no undissolved halogen, i. e., by allowing no active rays to fall upon the two phase system of undissolved halogen in contact with the hydrocarbon liquid. Irradiation in this manner is conducive to production of desirable proportions of the different halogenated compounds in the halogenated product; for example, high ratios of monohalogenated compounds to polyhalogenated compounds may be obtained when chlorinating unchlorinated hydrocarbons. Inasmuch as obtainment of the high ratios referred to is one of the objectives, this is an important feature and represents the preferred method of irradiation of this invention. The relatively low ratios of monohalogenated derivatives to polyhalogenated derivatives heretofore obtained, for example in chlorination methods involving irradiation and chlorine introduction in the same zone as practiced in the prior art methods above described, I believe are due to reaction occurring at the interface between chlorine gas and the liquid in the two-phase system, at which areas the chlorine is in excess. This condition of excess chlorine is apparently more conducive to formation of polychlorinated compounds than monochlorinated compounds. The results obtained in the present invention are apparently due primarily to the fact that the solution irradiated contains a uniform concentration of halogen and contains no areas of high halogen concentration such as those described.

Irradiation of the solution of halogen and hydrocarbon may be performed in various ways in accordance with the invention, the essential consideration being that substantially none of the undissolved halogen (for example, chlorine gas bubbles in the case of chlorination) be in contact with the solution when the latter is exposed to the active rays. This involves irradiation of the solution in a zone remote from the mixing zone. The preferred practice is to mix the halogen and hydrocarbon in an opaque mixing vessel, remove from the mixing vessel at least a portion of the resulting solution, and irradiate the same in a separate vessel.

The two features discussed hereinabove, namely, addition of substances effective to promote formation of a reactive solution and irradiation of the solution as a single phase, each presents new and useful results. The invention is to be considered as including these features individually as well as in combination.

In the preferred practice of the invention these features are combined to provide a readily controlled photochemical method by which hydrocarbons can be converted to desirable halogenated products in relatively short periods. Illustrative of the preferred practice, using diffused daylight as the active rays, the hydrocarbon liquid to be chlorinated is placed in a substantially opaque vessel provided with a chlorine inlet opening below the surface of the liquid and an air inlet which may open above or below the surface of the liquid. A suitable reaction vessel preferably in the form of a glass coil, preferably cooled, as by a water-jacket or the like is connected to the mixing vessel by means of a suitable conduit, at a point removed from the zone of chlorine introduction so that a photochemically active chlorine-hydrocarbon solution substantially free from gaseous chlorine may be conveyed from the mixing vessel to the reaction vessel. In the latter vessel it is irradiated by exposure to diffused daylight. Another conduit is provided which conveys the irradiated liquid back to the mixing vessel again for further chlorine treatment. Any suitable means may be provided for removal, from the reaction vessel, of the hydrogen chloride which is formed during the reaction.

The chlorine is bubbled through the hydrocarbon liquid in the opaque mixing vessel and the resulting substantially gas-free solution is circulated through the reaction vessel. After being cooled and irradiated in the latter vessel, the irradiated liquid is cycled back to the opaque vessel. This process is repeated, and at the start of each cycle a few bubbles of air are admitted to the liquid in the mixing vessel. The amount of air to be admitted in any given case depends upon the particular hydrocarbon and the amount thereof being chlorinated. In any event it is only necessary to admit sufficient air to cause continual formation of the photochemical reaction. In each cycle, before passing the solution to the reaction zone for irradiation a period of time should be allowed for formation of the photochemically active solution. While the solution may be passed to the reaction vessel after reaching any desired concentration, it is preferred to first form a solution of maximum concentration in order to obtain greater conversions per pass. The solution period required for maximum concentration varies with different hydrocarbons being treated, but is determinable in any particular case by a relatively sudden increase in pressure in the mixing vessel as the chlorine is bubbled in at a constant rate. This increase in pressure indicates that no further chlorine is being taken up by the hydrocarbon.

As stated hereinabove, the addition of too much of the oxygen yielding substance seems to inhibit the reaction. In such cases the solution, when exposed to active rays in the manner stated will exhibit little or no photochemical reaction. When this condition occurs the solution should be cycled through the reaction vessel and back to the mixing vessel several times without further addition of the said oxygen yielding substance. After several cycles the solution will become photochemically active. In this manner the proper amounts of the oxygen yielding substances to be added to cause formation of the photochemically active solution can be determined for any given hydrocarbon.

In certain cases cooling of the mixing vessel is desirable in order to supplement the cooling effect of the reaction vessel. Cooling of the solution is a contributing factor conducive to smooth operation, safety and formation of higher ratios of mono-to-polychlor-derivatives. Preferably, the capacities of the mixing and reaction vessels are such that the volume of liquid being irradiated at any given time is relatively small as compared to the total volume of liquid in the system. I have found that with these conditions maintained the process is easier to control and best results are obtained.

The process may be discontinued when the desired chlorinated product is obtained, as indicated by the characteristics of fractions thereof produced by distillation of samples, or by the specific gravity of the irradiated solution. The specific gravity of the product increases with increase in the degree of chlorination. In general the shorter the time of chlorination of a given hydrocarbon the higher will be the ratio of mono- to poly-chlorinated products and the lower will be the specific gravity. Since the time of chlorination necessary to produce a given ratio varies with the individual hydrocarbons to be treated and other conditions no set time limits can be given which will be applicable for all cases. The following examples will serve to indicate the yields obtainable after given periods of chlorination of several different hydrocarbons.

*Example I*

1300 grams of cyclohexane were placed in a three liter opaque vessel connected to a water-cooled glass coil in the manner described hereinabove. Chlorine was introduced at the rate of about 110 grams per hour. The resulting yellow solution was irradiated in the water cooled glass coil by exposure to diffused daylight. The hydrogen chloride evolved was removed and the resulting colorless liquid was returned to the mixing vessel. 10 to 20 bubbles of air were introduced into the mixing vessel and the process was repeated. After chlorinating in this manner for five hours a test sample of irradiated liquid had a specific gravity of 0.89. Distillation of the sample showed it to contain 42–45% monochlorocyclohexane (B. P. 140–145° C.), 10–13% dichlorcyclohexane and about 45% unreacted cyclohexane. After 2 hours further chlorination a sample showed a specific gravity of 0.94 and contained 50–53% monochlorcyclohexane, 21–24% dichlorcyclohexane and 26% unreacted hydrocarbon. After another two hours chlorination in this manner the specific gravity had reached 0.99 and a sample showed 54–57% monochlorcyclohexane, 26–29% dichlorcyclohexane and 17% unreacted cyclohexane.

After the 9 hour run the bulk of the liquid was distilled. 935 grams of monochlorcyclohexane were recovered distilling at 65–70° C. at about 30 mm. pressure.

Calculations show that approximately 83% by weight of the original cyclohexane had been converted to chlorinated products.

*Example II*

1000 grams of a hydrogenated Conroe petroleum fraction of boiling point 75–87° C. and specific gravity of 0.73 were photochemically chlorinated in like manner, admitting 10–20 bubbles of air after each cycle. The product after five hours chlorination had a specific gravity of 0.86 and after 9 hours a specific gravity of 0.96. Distillation after the 9 hour period gave 693 grams of a monochlor fraction boiling at 130°–155° C. (60°–75° at 25–30 mm.), 327 grams of a dichlor fraction boiling at 95–115° C. at 25 mm., 103 grams of a residue containing polychlor compounds and 243 grams of recovered hydrocarbon.

The monochlor product represents 51% by weight of the product or 69% on a basis of the starting material.

The following Example III shows that the presence of water is not necessary to practice of the process, satisfactory results being obtained when operating under substantially anhydrous conditions.

*Example III*

A petroleum hydrocarbon distillate boiling between 93° and 125° C. was dried over anhydrous calcium sulfate and then filtered into a dried apparatus similar to that described above. The chlorine used was dried by passing through concentrated sulfuric acid. Bright yellow solutions were obtained after chlorinating for a short period and adding 30 to 50 bubbles of dried air at intervals. Duration of the solution periods prior to passing the solution to the reaction vessel and after each air treatment were from 8 to 10 minutes. During part the run 30 to 50 bubbles of dried oxygen were added instead of air. In 5 hours chlorination the specific gravity rose from an initial value of 0.75 to 1.01, and the product contained 74% chlorinated products.

Other runs were made using only hydrogen peroxide as the oxygen yielding addition substance. The hydrogen peroxide was introduced into the mixing vessel at intervals by means of a dropping funnel. Satisfactory results were obtained.

Example IV 1400 grams of a hydrogenated Conroe cut, boiling point 93–125° C. (high in methylcyclohexane), specific gravity 0.74, were similarly photochemically chlorinated, using 5 grams of benzoyl peroxide instead of the air treatment. The benzoyl peroxide was dissolved in benzene and added to the hydrocarbon in the mixing vessel. The yellow solution formed immediately and evolved hydrogen chloride on exposure to light in the irradiation zone. Upon recycling, the hydrocarbon again formed a yellow color in the mixing vessel. After an hour, it was necessary to add more peroxide to cause the yellow solution to form. The specific gravity was now 0.79; after 3¾ hours it was 0.82; and after a total of 5¾ hours the specific gravity was 0.86. Benzoyl peroxide was added from time to time in very small quantities when the yellow solution ceased to form. Distillation of the product showed it contained 48% recovered hydrocarbon, 44–49% monochlor-fraction, boiling point 140–180° C., and 3–8% residue.

Example V 1600 grams of propylene dichloride, boiling point 96.8° C., specific gravity 1.166 were chlorinated in like manner using air as the added agent. The temperature of the opaque mixing flask and of the irradiation coil was maintained at about 15° C. throughout the process. The solution formed at first was of a light yellow color and failed to react when exposed to diffused daylight in the irradiation coil. This light yellow solution was then returned to the mixing vessel and 15 to 25 bubbles of air were admitted. This resulted in the solution becoming deep yellow in color. When this deep yellow solution was exposed to diffused daylight in the irradiation zone, it gave off bubbles of gas, indicating a reaction. The solution was recycled in this manner for 5 hours, 15–25 bubbles of air being added to the opaque mixing vessel after each cycle. At the end of this period the solution had a specific gravity of 1.260, and upon fractionation gave:

264 gms. of 1,2,2 trichlorpropane, B. P. 123 to 125° C., 21° C. (47%)
110 gms. of 1,1,2 trichlorpropane, B. P. 132 to 135° C., 21° C. (19%)
186 gms. of 1,2,3 trichlorpropane, B. P. 154 to 156° C., 21° C. (34%)

and 779 grams of overhead material boiling from 96° C. to 118° C. composed mainly of unreacted propylene dichloride. Substantially no tetrachlorpropane was produced.

Obtainment by this method of the relatively high proportions of 1,2,2- and 1,2,3-trichlorpropane is an unexpected result inasmuch as direct chlorination of propylene dichloride by prior art methods has always resulted in products containing large proportions of the 1,1,2 trichlorpropane and extremely small proportions of 1,2,3 trichlorpropane. The present invention, therefore, represents an easy, economical and rapid method of producing relatively large amounts of 1,2,2 trichlorpropane and 1,2,3 trichlorpropane by direct chlorination.

Besides the lighter hydrocarbons described, waxes may be halogenated by the process of this invention. Example VI illustrates the application of the process to wax chlorination.

Example VI

A hydrocarbon wax of melting point 125° F. was melted and placed in the opaque mixing vessel of the apparatus described above. In this case the mixing vessel was heated to a temperature of 130° F. in order to maintain the wax in fluid condition. Chlorine and air were introduced in the manner described in the above examples. The yellow solution which formed was cycled through the glass coil where it was exposed to diffused daylight in the manner stated hereinabove.

After 5 hours of this treatment the weight gain of the product indicated that 35–40% of the product consisted of chlorine. The product after washing with sodium carbonate solution and drying with nitrogen gas was colorless, odorless and non-corrosive to metals after 24 hours contact therewith at 100° C. These characteristics indicate that this product is more stable than material of the same chlorine content produced by chlorinating 125° F. melting point wax at the necessarily higher temperatures and longer periods of time by conventional prior art methods.

While the invention has been described at length hereinabove in its application to chlorination methods, it should be understood that the invention also is applicable when using other halogens. For example bromination is contemplated.

Although daylight was used as the active rays in the above examples, other rays capable of causing photochemical action can be used.

The invention is not to be considered limited to the particular form of apparatus described.

I claim:

1. A rapid and easily controllable method for producing monochlorinated hydrocarbons comprising introducing chlorine into a body of liquid hydrocarbon in a mixing vessel opaque to active rays in the presence of a sufficient amount of an oxygen yielding substance to produce a solution reactive upon exposure to active rays, removing a portion of the resulting solution from the mixing zone, cooling and irradiating said solution with active rays to produce a partially chlorinated liquid and hydrogen chloride, removing the hydrogen chloride, cycling the partially chlorinated liquid back to the mixing vessel for further chlorine treatment and repeating the process while maintaining present in the mixing vessel during the process sufficient of the oxygen yielding substance to cause formation of the said reactive solution.

2. A rapid and easily controlled photochemical method for producing high yields of chlorinated products high in monochlorinated derivatives comprising in combination the steps of mixing in an opaque vessel chlorine, a hydrocarbon liquid and a quantity of air sufficient to cause formation of a solution highly reactive upon exposure to active rays, transferring a portion of the solution from the opaque vessel to an irradiation vessel, and irradiating said portion, cycling the irradiated liquid back to said mixing vessel for further chlorine treatment and repeating the process until the desired product is obtained.

3. A rapid and easily controlled photochemical method for producing high yields of chlorinated products high in monochlorinated derivatives comprising in combination, the steps of mixing in an opaque vessel chlorine, a hydrocarbon liquid and a quantity of a peroxide sufficient to cause formation of a solution highly reactive upon exposure to active rays, transferring a portion of the solution from the opaque vessel to an irradiation vessel, cooling and irradiating said solution in said irradiation vessel by exposure to active rays, cycling the irradiated liquid back to said mixing vessel for further chlorine treatment and repeating the method until the desired product is obtained.

4. A rapid and easily controlled photochemical method for producing high yields of chlorinated products high in monochlorinated derivatives comprising in combination the steps of intimately mixing in an opaque vessel chlorine, a hydrocarbon liquid and a quantity of organic peroxide sufficient to cause solution of the chlorine in the hydrocarbon liquid, transferring a portion of the solution from the opaque vessel to an irradiation vessel, irradiating said solution in said irradiation vessel, cycling the irradiated liquid back to said mixing vessel for further chlorine treatment and repeating the process until the desired product is obtained.

5. A rapid and easily controlled method of chlorinating a petroleum fraction comprising admixing said fraction in a mixing zone opaque to active rays with chlorine in the presence of an added oxygen yielding substance in amounts effective to cause formation of a photochemically active solution productive upon irradiation with active rays of maximum yields of chlorinated products, removing said solution from the mixing zone and thereafter irradiating said solution with active rays.

6. A method for producing substantially colorless, odorless and non-corrosive chlorinated wax comprising admixing in an opaque mixing zone a wax with chlorine in the presence of an added oxygen containing substance in amounts effective to cause formation of a photochemically active solution and irradiating said solution with active rays in a zone containing substantially no gaseous chlorine.

7. A method for converting propylene dichloride into chlorinated products containing relatively high proportional amounts of 1,2,2 trichlorpropane and 1,2,3 trichlorpropane comprising admixing propylene dichloride and chlorine in a zone opaque to active rays in the presence of sufficient amounts of added air to cause formation of a photochemically active chlorine containing solution, separating said solution from gaseous chlorine and irradiating said solution with active rays.

8. A rapid method for the production of chlorinated organic material by photochemical reaction which comprises treating liquid organic material with chlorine in a mixing zone substantially opaque to active rays, continually cycling the resulting liquid from the mixing zone through a reaction zone, irradiating said liquid with active rays in the reaction zone, continually cycling the irradiated liquid back to the mixing zone, and after each cycle adding to the liquid in the mixing zone sufficient amounts of air to maintain active photochemical reaction and continuing the process until a substantial portion of the original organic material has been converted to chlorinated products.

9. Process for halogenating hydrocarbons comprising mixing said hydrocarbons with halogen in the presence of a sufficient amount of an oxygen-yielding substance to form a yellow solution containing hydrocarbons and dissolved halogen, subjecting said yellow solution to active rays to produce a substantially colorless solution containing halogenated hydrocarbons and unchanged hydrocarbons, then mixing said hydrocarbons with halogen in the presence of a sufficient amount of an oxygen-yielding substance to form a yellow solution containing hydrocarbons and dissolved halogen, and then subjecting the latter solution to active rays.

10. Process in accordance with claim 9, in which the halogen is chlorine.

11. Process for halogenating hydrocarbons comprising mixing said hydrocarbons in a zone opaque to active rays with halogen in the presence of a sufficient amount of an oxygen-yielding substance to form a yellow solution containing hydrocarbons and dissolved halogen, removing said yellow solution to a reaction zone and subjecting the same to active rays to produce a substantially colorless solution containing halogenated hydrocarbons and unchanged hydrocarbons, transferring said colorless solution to an opaque mixing zone, mixing said colorless solution with halogen in the presence of a sufficient amount of an oxygen-yielding substance to again form a yellow solution containing hydrocarbons and dissolved halogen, removing said yellow solution to a reaction zone and subjecting the same to active rays as before.

12. Process in accordance with claim 11 in which the halogen is chlorine.

13. Process for halogenating saturated hydrocarbons comprising mixing said saturated hydrocarbons with halogen and air to produce a yellow solution containing hydrocarbons and dissolved halogen, subjecting said yellow solution to active rays to produce a substantially colorless solution containing halogenated hydrocarbons and unreacted hydrocarbons, then mixing said substantially colorless solution with halogen and air to again produce a yellow solution containing hydrocarbons and dissolved halogen and subjecting the latter solution to active rays.

14. Process for chlorinating saturated hydrocarbons comprising mixing said saturated hydrocarbons with chlorine and air to produce a yellow solution containing hydrocarbons and dissolved chlorine, subjecting said yellow solution to active rays to produce a substantially colorless solution containing chlorinated hydrocarbons and unreacted hydrocarbons, then mixing said substantially colorless solution with chlorine and air to again produce a yellow solution containing hydrocarbons and dissolved chlorine and subjecting the latter solution to active rays.

15. In the process for photochemically halogenating hydrocarbons comprising irradiating with active rays a halogen-containing hydrocarbon solution to produce an irradiated liquid containing halogenated hydrocarbons and unchanged hydrocarbons, the improvement comprising mixing said irradiated liquid with halogen and an oxygen-yielding substance in amount effective to produce therefrom a yellow colored solution containing dissolved chlorine, chlorinated hydrocarbons and unchanged hydrocarbons and irradiating the latter solution with active rays, whereby said unchanged hydrocarbons are converted to halogenated hydrocarbons.

16. In a cyclic process for halogenating a body of hydrocarbons which comprises repeatedly dissolving halogen in a body of hydrocarbon-containing liquid in a mixing zone and irradiating the resulting halogen bearing solution with active rays in a reaction zone, the improvement comprising adding after each cycle to the body of hydrocarbon-containing liquid an oxygen-yielding substance in relatively small proportional amounts sufficient to maintain photo-chemical reaction and continuing the process until a substantial portion of the hydrocarbons has been halogenated.

CARL NAEHER ZELLNER.